(12) United States Patent
Kyogoku

(10) Patent No.: US 12,131,001 B2
(45) Date of Patent: Oct. 29, 2024

(54) IMAGE PROCESSING APPARATUS CAPABLE OF OPERATING THREE DIMENSIONAL VIRTUAL OBJECT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Takateru Kyogoku, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/544,518

(22) Filed: Dec. 19, 2023

(65) Prior Publication Data

US 2024/0211094 A1 Jun. 27, 2024

(30) Foreign Application Priority Data

Dec. 23, 2022 (JP) ................................. 2022-206873

(51) Int. Cl.
| | | |
|---|---|---|
| *G06F 3/04815* | (2022.01) | |
| *G06F 3/01* | (2006.01) | |
| *G06F 3/04842* | (2022.01) | |
| *G06F 3/04845* | (2022.01) | |
| *G06T 19/00* | (2011.01) | |

(52) U.S. Cl.
CPC .......... *G06F 3/04815* (2013.01); *G06F 3/017* (2013.01); *G06F 3/04842* (2013.01); *G06F 3/04845* (2013.01); *G06T 19/00* (2013.01); *G06T 2200/24* (2013.01)

(58) Field of Classification Search
CPC . G09G 3/04815; G06F 3/017; G06F 3/04842; G06F 3/04845; G06T 19/00; G06T 2200/24
See application file for complete search history.

(56) References Cited

U.S. PATENT DOCUMENTS 11,158,126 B1 * 10/2021 Petrov ..................... G06F 3/012
2016/0098094 A1 * 4/2016 Minkkinen ......... G06F 3/04883
345/156

FOREIGN PATENT DOCUMENTS

| JP | 5898830 B2 | 4/2016 |
| JP | 2017-033294 A | 2/2017 |
| JP | 2020-102184 A | 7/2020 |

* cited by examiner

*Primary Examiner* — Lixi C Simpson
(74) *Attorney, Agent, or Firm* — Carter, DeLuca & Farrell LLP

(57) ABSTRACT

An image processing apparatus capable of increasing a possibility that a three dimensional virtual object after an operation related to editing is transitioned to a state intended by an operator. The image processing apparatus allows the operator to perform an operation related to editing of a three dimensional virtual object. The image processing apparatus includes a memory device that stores instructions, and a processor that executes the instructions to display a first route after the operation, display a second route after the operation, the second route being different from the first route, allow the operator to select any one of coordinates on the first route, allow the operator to select any one of coordinates on the second route, and determine a state of the three dimensional virtual object based on the coordinate selected by the operator on either one of the first route and the second route.

15 Claims, 11 Drawing Sheets

*FIG. 4*

| LOCUS INFORMATION |
|---|
| (x1,y1,z1),(x2,y2,z2),⋯,(xn,yn,zn) |

*FIG. 10*

| LOCUS INFORMATION | TIP POINT COORDINATE INFORMATION |
|---|---|
| (x1,y1,z1),(x2,y2,z2),···,(xn,yn,zn) | (x,y,z) |

IMAGE PROCESSING APPARATUS CAPABLE OF OPERATING THREE DIMENSIONAL VIRTUAL OBJECT, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus capable of operating a three dimensional virtual object, a control method therefor, and a storage medium storing a control program therefor.

Description of the Related Art

In recent years, techniques, such as augmented reality (AR) and mixed reality (MR), that provide an operator with an experience in an environment having both reality and virtuality have been developed. Such techniques can show a composite world in which a virtual object is superimposed on a video image of a real world to an operator with a head mounted display (hereinafter referred to as an "HMD") mounted on a head of the operator. Further, in the mixed reality (MR), the operator can edit a three dimensional virtual object by a hand movement detected with various sensors with a feeling as if the three dimensional virtual object is moved, enlarged/reduced, or rotated by an operator's own hand.

However, it is generally difficult for an operator to edit a three dimensional virtual object as desired. This is because training is required for the operator to precisely move the hand, and the accuracy of the sensors also affects an editing result. Japanese Patent Publication No. 5898830 (WO 2008/084437) discloses a technique that displays an intermediate state in a history based on an operation locus of an operator as a candidate of an editing state that is a transition target after undo (hereinafter, referred to as a "candidate") when the operator desires to undo the editing.

However, there is a problem in that the intermediate state in the history displayed on the basis of the operation locus of the operator may not be a candidate intended by the operator. Specifically, a hand interaction that recognizes an image of an operator's hand and edits a three dimensional virtual object on the basis of the hand movement is considered as one of operation methods in a three dimensional space. The editing by the hand interaction needs the operator to do training in order to precisely move the hand as described above. Depending on the accuracy of the sensors, shaking of the operator's hand may be faithfully reproduced, or conversely, the locus of the operator's hand may not be faithfully reproduced. In such a situation, even if the state of the three dimensional virtual object is traced back to the past and displayed after the operation related to editing, the candidate intended by the operator may not be displayed.

SUMMARY OF THE INVENTION

The present invention provides an image processing apparatus, a control method therefor, and a storage medium storing a control program therefor, which are capable of increasing a possibility that a three dimensional virtual object after an operation related to editing is transitioned to a state intended by an operator.

Accordingly, an aspect of the present invention provides an image processing apparatus in which an operation related to editing of a three dimensional virtual object is performed by an operator, the image processing apparatus including a memory device that stores a set of instructions, and at least one processor that executes the set of instructions to display a first route after the operation, display a second route after the operation, the second route being different from the first route, allow the operator to select any one of coordinates on the first route, allow the operator to select any one of coordinates on the second route, and determine a state of the three dimensional virtual object based on the coordinate selected by the operator on either one of the first route and the second route.

According to the present invention, it is possible to increase a possibility that a three dimensional virtual object after an operation related to editing is transitioned to a state intended by an operator.

Further features of the present invention will become apparent from the following description of exemplary embodiments with reference to the attached drawings.

BRIEF DESCRIPTION OF THE DRAWINGS

FIG. 4 is a view showing an example of information held by a route information holding unit in the first embodiment.

FIG. 10 is a view showing an example of information held by a route information holding unit in the second embodiment.

DESCRIPTION OF THE EMBODIMENTS

Figure 1:
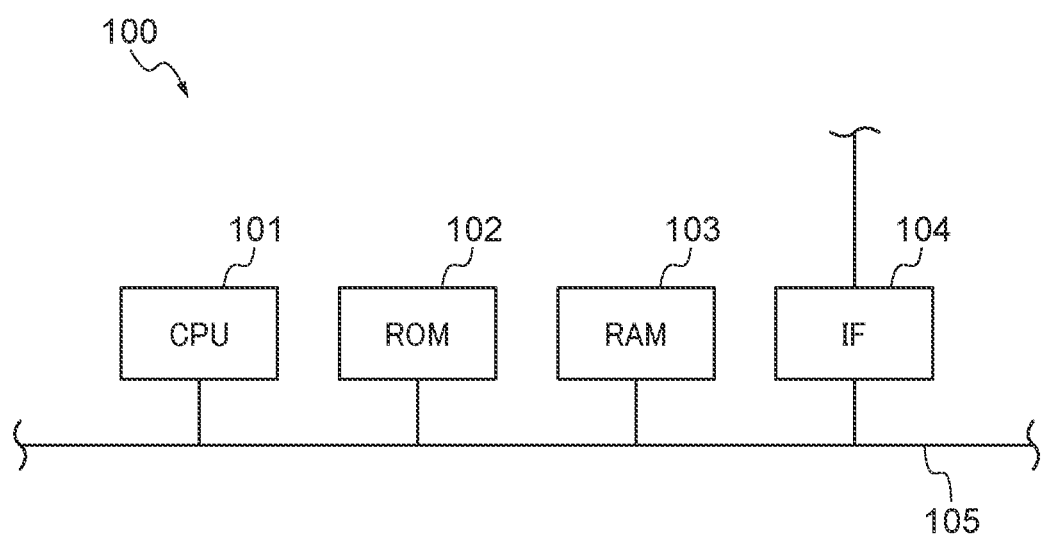
FIG. 1 is a view showing a configuration of a head mounted display (an HMD) as an example of an image processing apparatus to which the present invention is applicable.

Hereafter, embodiments according to the present invention will be described in detail by referring to the drawings. However, configurations described in the following embodiments are merely examples, and the scope of the present invention is not limited by the configurations described in the embodiments. For example, each unit constituting the present invention can be replaced with any configuration capable of exhibiting the same function. In addition, an arbitrary constituent may be added. Any two or more configurations (features) of the embodiments can be combined. Further, in the accompanying drawings, the same or similar components are denoted by the same reference numerals, and redundant descriptions are omitted.

Hereinafter, a first embodiment will be described with reference to FIG. 1 to FIG. 7. FIG. 1 is a view showing a configuration of a head mounted display (HMD) 100 as an example of an image processing apparatus to which the present invention is applicable. The HMD 100 includes a CPU 101, a ROM 102, a RAM 103, an I/F 104, and a bus 105. The CPU 101, ROM 102, RAM 103, and I/F 104 are connected via the bus 105. The CPU 101 denotes a processor, the ROM 102 denotes a read only memory, the RAM 103 denotes a random access memory, and the I/F 104 denotes an external interface. Operations of the HMD 100 is achieved by executing programs recorded in the ROM 102 or the RAM 103.

The RAM 103 is also used as a work memory to store temporary date of a process performed by the CPU 101. The I/F 104 is an interface for communicating with an external device. An image of the real world and operation information described later are Input to the I/F 104. The I/F 104 outputs an image to be displayed in the HMD 100. Although the only one CPU 101 is shown in FIG. 1, the HMD 100 may be provided with a plurality of processors. The HMD 100 may also include additional components, such as a graphic processing unit (GPU).

Although only the RAM 103 is shown as the temporary work memory in FIG. 1, secondary and tertiary storage areas may be provided by an identical or different medium in the HMD 100. The different medium may be a hard disk drive (HDD), a solid state drive (SSD), etc. Also, the configuration of the bus 105 is not limited to the configuration shown in FIG. 1. For example, the bus 105 may be configured so that the components will be connected in multiple stages. Further, the image processing apparatus to which the present invention is applicable is not limited to the HMD 100 having all the components shown in FIG. 1. For example, a device that is connected to the HMD 100 by wire or wireless and includes some or all of the components shown in FIG. 1 may be provided separately from the HMD 100.

Figure 2A:
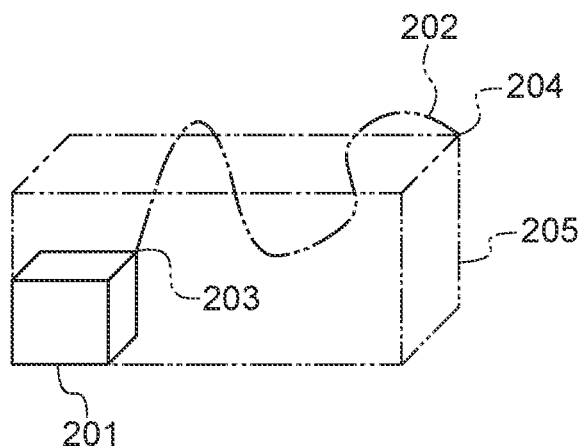
FIG. 2A, FIG. 2B, and FIG. 2C are views showing examples of images that are displayed by the HMD in the first embodiment.
Figure 2B:
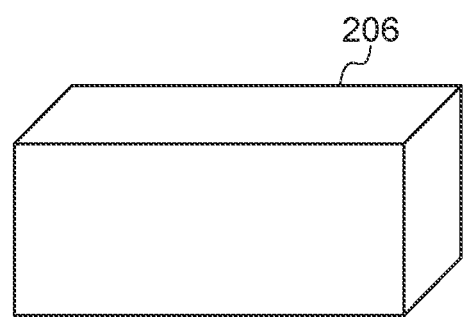
Figure 2C:
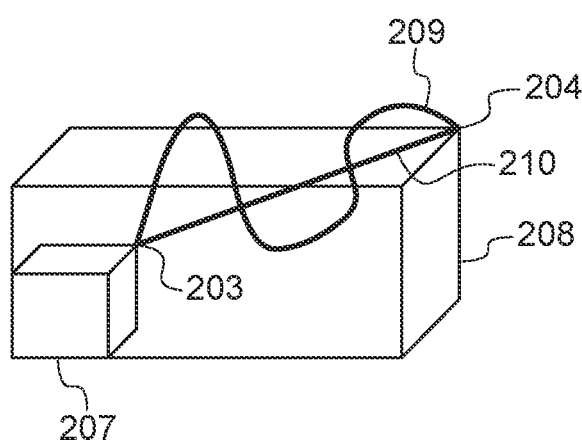

FIG. 2A, FIG. 2B, and FIG. 2C are views showing examples of images displayed by the HMD 100 in the first embodiment. FIG. 2A, FIG. 2B, and FIG. 2C show a case where an operator performs operations related to editing of a three dimensional virtual object 201 using hand interaction. FIG. 2A shows a state immediately before determining the editing of the three dimensional virtual object 201. A locus 202 indicates a locus of a hand during the hand interaction when the operator edits the three dimensional virtual object 201. In the locus 202, a contact point with the three dimensional virtual object 201 is an operation start point 203 (a start point of the locus), and a tip end opposite to the operation start point 203 is an operation end point 204 (an end point of the locus). The operator starts the editing of the three dimensional virtual object 201 by selecting the operation start point 203 by the hand. Thereafter, the hand of the operator moves along the locus 202 and reaches the operation end point 204. An operation-time virtual object 205 indicates the shape of the three dimensional virtual object 201 when the hand of the operator moves and reaches the operation end point 204. Therefore, in the editing shown in FIG. 2A and FIG. 2B, the size of the operation-time virtual object 205, that is, the size of the three dimensional virtual object 201 is changed in accordance with the hand movement of the operator.

Then, when the operator determines the editing of the three dimensional virtual object 201, the state shown in FIG. 2A transitions to the state shown in FIG. 2B. FIG. 2B is a view showing the state when the operator determines the editing of the three dimensional virtual object 201. As shown in FIG. 2B, when the operator determines the editing of the three dimensional virtual object 201, a post-editing virtual object 206 is displayed. The post-editing virtual object 206 is displayed in the size of the three dimensional virtual object 201 at the time when the operator determines the editing. When the size of the post-editing virtual object 206 does not match the size intended by the operator, the operator undoes the editing of the three dimensional virtual object 201. Then, the state shown in FIG. 2B transitions to the state shown in FIG. 2C.

FIG. 2C shows the state immediately after the operator undoes the editing of the three dimensional virtual object 201. As shown in FIG. 2C, immediately after the operator undoes the editing of the three dimensional virtual object 201, a post-undoing virtual object 207, a pre-undoing virtual object 208, a first route 209, and a second route 210 are displayed. The post-undoing virtual object 207 is displayed in the size of the three dimensional virtual object 201 immediately before the editing by the operator, that is, in the size of the three dimensional virtual object 201 shown in FIG. 2A. The pre-undoing virtual object 208 is displayed in the size of the three dimensional virtual object 201 immediately before the operator undoes the editing, that is, in the size of the post-editing virtual object 206 shown in FIG. 2B. The first route 209 is the locus 202 shown in FIG. 2A and is indicated by a thick line.

The second route 210 is a straight line connecting the operation start point 203 and the operation end point 204 of the first route 209, i.e. of the locus 202 shown in FIG. 2A, and is indicated by a thick line. Therefore, the second route 210 is different from the first route 209, and indicates the shortest distance from the operation start point 203 to the operation end point 204 of the locus 202 shown in FIG. 2A. In the state where the editing of the three dimensional virtual object 201 is undone, the operator can change the size of the post-undoing virtual object 207 by moving the hand on the first route 209 or the second route 210.

When there is a size intended by the operator among the sizes of the post-undoing virtual object 207 that are changed in accordance with the hand movement, the operator selects a coordinate on the first route 209 or the second route 210 at which the size intended by the operator is obtained with the hand and determines to undo the editing. That is, the operator determines to undo the editing of the three dimensional virtual object 201 by manually selecting the coordinate on the first route 209 or the second route 210. In the meantime, when there is no size intended by the operator among the sizes of the post-undoing virtual object 207 that are changed in accordance with the hand movement, the operator finishes undoing the editing of the three dimensional virtual object 201 and edits the three dimensional virtual object 201 again. When there is no size intended by the operator among the sizes of the post-undoing virtual object 207 changed in accordance with the hand movement, the operator may perform another method instead of finishing undoing the editing of the three dimensional virtual object 201 as described above. For example, the operator may manually select the end point of the first route 209 or the second route 210.

In addition, the methods for achieving the operation of starting editing of the three dimensional virtual object 201, the operation of determining the editing, the operation of undoing the editing, the operation of selecting a coordinate (the operation of determining to undo the editing), and the operation of finishing undoing the editing, do not limit the scope of the present invention. As an example of a method for achieving each operation, a gesture by an operator's hand is conceivable. In this case, a form of a gesture, such as pinching or sweeping by the hand of the operator, which can be recognized with a sensor and an image process is assigned to each operation. Further, each operation may be achieved by a gesture using a part other than the hand of the operator or by a physical input means. As the physical input means, there is, for example, an operation-dedicated button included in a hardware device mounted on the hand of the operator. The gesture of selecting a coordinate and the gesture of determining to undo the editing of the three dimensional virtual object 201 may be assigned with the same type of gesture or different types of gestures.

Figure 3:
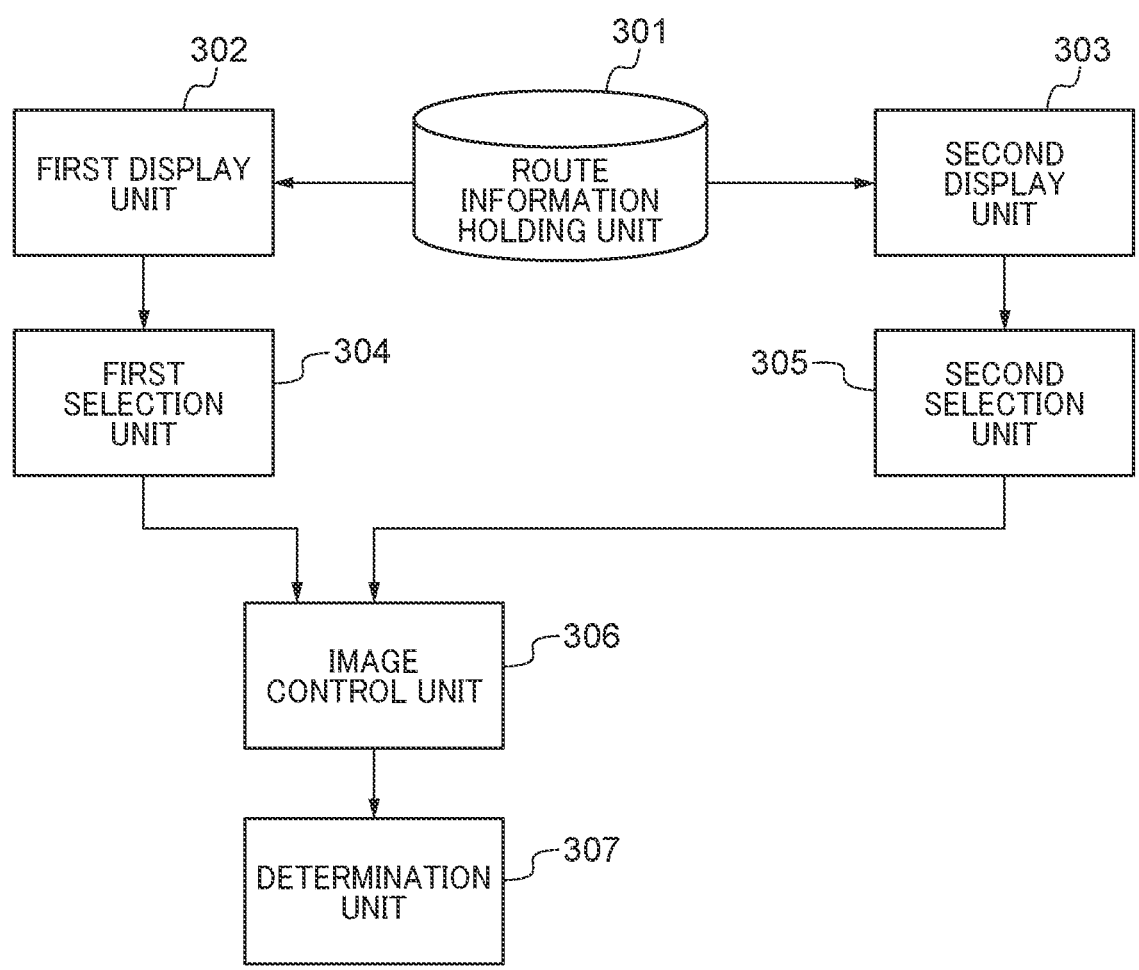
FIG. 3 is a view showing a software logical configuration of the HMD.

FIG. 3 is a view showing a software logical configuration of the HMD 100. A route information holding unit 301 holds locus information included in the operation information input via the I/F 104. The operation information relates to an operation performed by the operator at one time. The locus information indicates a hand movement of the operator in an operation performed by the operator at one time. Specifically, the locus information indicates the locus 202 in FIG. 2A, i.e., indicates the first route 209 in FIG. 2B. In this way, since the route information holding unit 301 holds the locus information included in the operation information, it is possible to achieve the operation of undoing the editing of the three dimensional virtual object 201.

The route information holding unit 301 may hold information indicating hand movements in operations performed by the operator several times by holding pieces of locus information included in the respective pieces of operation information. In addition, the definition of "one time" of operations performed by the operator may be changed. For example, an operation period corresponding to "one time" may be determined by a gesture of the operator. In addition, a period interposed between periods in which the operation is stopped for a predetermined time or more may be set as an operation period corresponding to "one time". In this case, whether the operation has been stopped for the predetermined time or more may be determined using a threshold value of the movement amount.

The first display unit 302 displays the locus information held in the route information holding unit 301 as a route when the operator performs an operation to undo editing. Here, as described above, the locus information held in the route information holding unit 301 is included in the operation information that relates to the operation performed by the operator at one time. Therefore, the first display unit 302 displays the route of the hand movement of the operator in the operation performed by the operator at one time. Specifically, the first display unit 302 displays the first route 209 shown in FIG. 2C. The locus information displayed by the first display unit 302 is not limited to information included in one piece of operation information, and may be, for example, information included in a plurality of pieces of operation information. In this case, the first display unit 302 displays the route of the hand movement of the operator with a plurality of lines for the respective operations performed by the operator several times.

When the operator performs an operation to undo editing, the second display unit 303 displays a straight line connecting the start point and the end point of the locus information held in the route information holding unit 301 as a route. Here, as described above, the locus information held in the route information holding unit 301 is included in the operation information that relates to the operation performed by the operator at one time. Therefore, the second display unit 303 displays a straight line connecting the start point and the end point of the hand movement performed by the operator in one operation. Specifically, the second display unit 303 displays the second route 210 shown in FIG. 2C. In the meantime, the locus information handled by the second display unit 303 is not limited to information included in one piece of operation information, and may be, for example, information included in a plurality of pieces of operation information. In this case, the second display unit 303 may display a straight line connecting the start point of the hand movement of the operator in the first operation and the end point of the hand movement of the operator in the last operation among the operations performed by the operator several times. In addition, the second display unit 303 may display a plurality of straight lines each of which connects the start point and the end point of the hand movement of the operator in each operation as routes.

The first selection unit 304 allows the operator to select any coordinate by the operator selecting any position on the route displayed by the first display unit 302. The second selection unit 305 allows the operator to select any coordinates by the operator selecting any position on the route displayed by the second display unit 303. That is, the operator can select any coordinate on the route displayed by the first display unit 302 or the route displayed by the second display unit 303 using the first selection unit 304 or the second selection unit 305. Specifically, the operator can select any coordinate on the first route 209 or the second route 210 shown in FIG. 2C.

The image control unit 306 changes a process applied to the image displayed in the HMD 100 until the operator selects any coordinate. This change secures a visual effect in the three dimensional space of the HMD 100 without affecting the processing speed of editing of the three dimensional virtual object 201 by switching a display detailed degree of a polygon, installation of a light source, or necessity of a post process according to the moving speed of the hand of the operator. A trigger for changing the image process is not limited to the moving speed of the hand of the operator, and may be, for example, a position, posture, or gesture of the hand of the operator, or other actions of the operator. In addition, the change of the image process is not limited to the above-described matters, and may be, for example, calculation of depth information, extraction of a feature point, and calculation of plane detection, which are often used as the image process, may be switched or such calculation may not be performed.

When the operator selects any coordinate, the determination unit 307 determines a state to which the editing target object transitions as a result of the operation of undoing the editing based on the coordinate selected by the operator. Specifically, after the operator performs the operation of undoing the editing of the three dimensional virtual object 201, the determination unit 307 determines the size to which the three dimensional virtual object 201 transitions on the basis of the coordinate selected by the operator. Further, the determination unit 307 restores the image process changed by the image control unit 306 to the original state.

Figure 4:
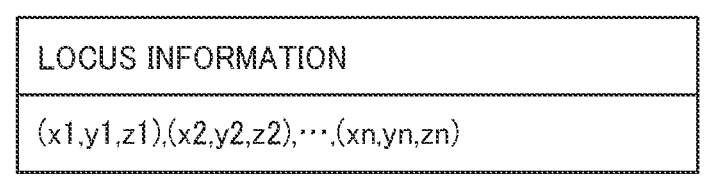

FIG. 4 is a view showing an example of information held by the route information holding unit 301 in the first embodiment. As shown in FIG. 4, the route information holding unit 301 holds the locus information as continuous three dimensional coordinates. As described above, the locus information indicates the hand movement of the operator in the operation performed by the operator at one time. Granularity of the locus information is not limited to a specific granularity, and may be, for example, a minimum granularity that can be represented as a three dimensional space or a granularity depending on a device or a sensor. The granularity of the locus information may be changed whenever the locus information is obtained or may be changed during the obtainment of the locus information. In addition, the locus information may include three dimensional vector information.

Next, a flow of the process performed in the HMD 100 will be described with reference to the flowcharts in FIG. 5 to FIG. 8. The flowcharts (a control method for the image processing apparatus) in FIG. 5 to FIG. 8 are achieved by developing a program recorded in the ROM 102 to the RAM 103 and executing the program by the CPU 101 (a computer). This also applies to a flowchart in FIG. 11 described later.

Figure 5:
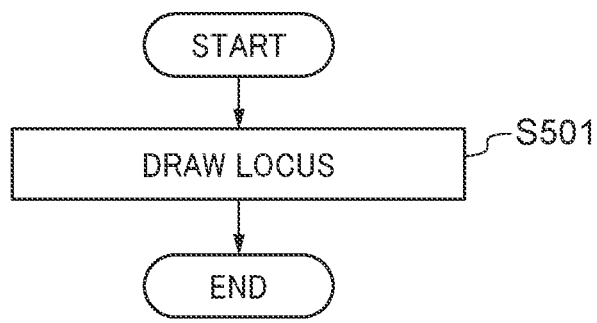
FIG. 5 is a flowchart for implementing a first display unit in the first embodiment.

FIG. 5 is a flowchart for achieving the first display unit 302 in the first embodiment (a first display step). The flowchart in FIG. 5 is started when the operator performs an operation to undo the editing as described in the description of the software logical configuration in FIG. 3. In step S501, the CPU 101 draws a locus in the three dimensional space of the HMD 100 on the basis of the locus information held by the route information holding unit 301. Specifically, the CPU 101 displays the first route 209 shown in FIG. 2C. Thereafter, the flowchart in FIG. 5 ends.

In the step S501, the locus drawn by the CPU 101 is not limited to the locus drawn on the basis of the locus information. Further, the CPU 101 may draw a locus with a specific thickness so that the operator can easily select the coordinate, or may draw a locus while changing the thickness depending on a situation. For example, the CPU 101 may draw a locus to be thinner as the distance from the operator is shorter, and may draw a locus to be thicker as the distance from the operator is longer in the three dimensional space of the HMD 100. In addition, the CPU 101 may change the three dimensional coordinates of the locus information according to the situation. For example, the CPU 101 may change the three dimensional coordinates of the locus information so as to absorb erroneous characteristics of the sensor, or may change the three dimensional coordinates of the locus information depending on a resolution of the image.

The flowchart in FIG. 5 can also be used as a flowchart for achieving the second display unit 303 (a second display step). In this case, in the step S501, the CPU 101 draws a straight line connecting the start point and the end point of the three dimensional coordinates of the locus information held by the route information holding unit 301 in the three dimensional space of the HMD 100. Specifically, the CPU 101 displays the second route 210 shown in FIG. 2C mentioned above. The other processes are the same as those for achieving the first display unit 302 described above.

Figure 6:
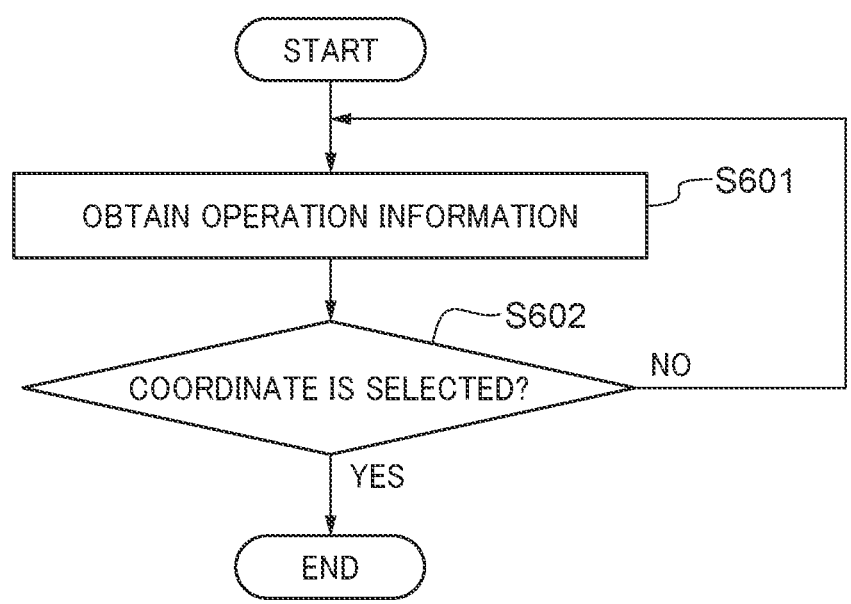
FIG. 6 is a flowchart for implementing a first selection unit.

FIG. 6 is a flowchart for achieving the first selection unit 304 (a first selection step). The flowchart in FIG. 6 is started when the first display unit 302 draws the locus. In step S601, the CPU 101 obtains the operation information of the operator via the I/F 104. In step S602, the CPU 101 determines whether the operator has selected any coordinate on the locus drawn by the first display unit 302. Specifically, the CPU 101 determines whether the operator has selected any one of the coordinates on the first route 209 shown in FIG. 2C. This determination is performed on the basis of the operation information of the operator obtained in the step S601. When the CPU 101 determines that the operator has not selected any one of the coordinates on the locus drawn by the first display unit 302, the process returns to the step S601.

In the meantime, when the CPU 101 determines that the operator selects any one of the coordinates on the locus drawn by the first display unit 302, the flowchart in FIG. 6 ends. Note that the flowchart in FIG. 6 may also end when the CPU 101 determines that the operator has selected any one of the coordinates on the straight line drawn by the second display unit 303. That is, the flowchart in FIG. 6 may also end when the CPU 101 determines that the operator has selected any one of the coordinates on the second route 210 shown in FIG. 2C. This determination is also performed on the basis of the operation information of the operator obtained in the step S601.

The flowchart in FIG. 6 can also be used as a flowchart for achieving the second selection unit 305 (a second selection step). In this case, the flowchart in FIG. 6 is started when the second display unit 303 draws a straight line. The step S601 is as described above. In the step S602, the CPU 101 determines whether the operator has selected any one of coordinates on the straight line drawn by the second display unit 303. Specifically, the CPU 101 determines whether the operator has selected any one of the coordinates on the second route 210 shown in FIG. 2C. This determination is performed on the basis of the operation information of the operator obtained in the step S601. When the CPU 101 determines that the operator has not selected any one of the coordinates on the straight line drawn by the second display unit 303, the process returns to the step S601.

In the meantime, when the CPU 101 determines that the operator has selected any one of the coordinates on the straight line drawn by the second display unit 303, the flowchart in FIG. 6 ends. Note that the flowchart in FIG. 6 may also end when the CPU 101 determines that the operator has selected any one of the coordinates on the locus drawn by the first display unit 302. Specifically, when the CPU 101 determines that the operator has selected any one of the coordinates on the first route 209 shown in FIG. 2C, the flowchart in FIG. 6 may also end. This determination is also performed on the basis of the operation information of the operator obtained in the step S601.

Figure 7:
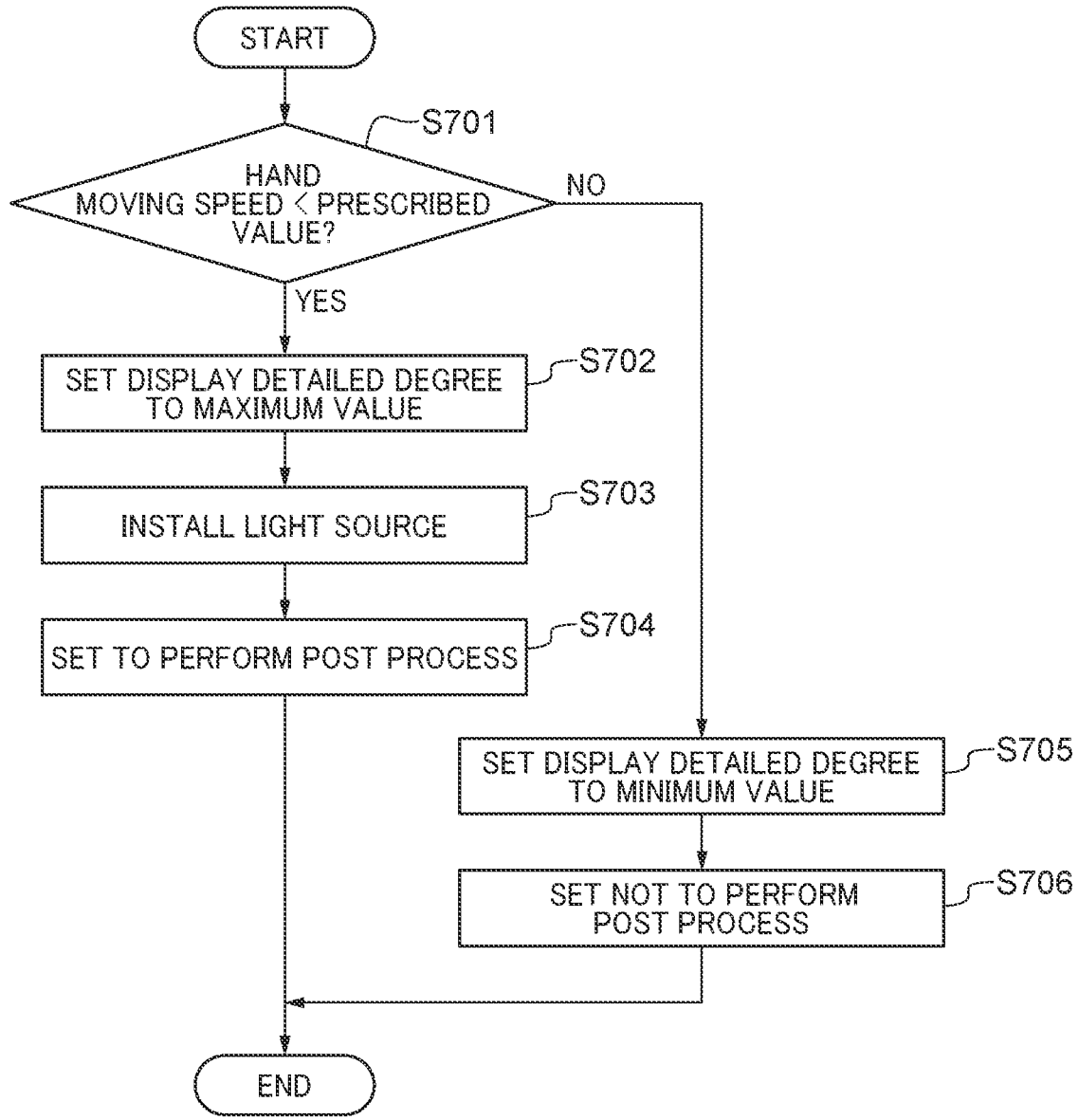
FIG. 7 is a flowchart for implementing an image control unit.

FIG. 7 is a flowchart for achieving the image control unit 306. The flowchart in FIG. 7 is started until the operator selects any one of the coordinates as described in the description of the software logical configuration in FIG. 3. More specifically, the flowchart in FIG. 7 is started at any time point from a time point at which the operator performs the operation to undo the editing of the three dimensional virtual object 201 to a time point at which the operator selects any one of the coordinates. In step S701, the CPU 101 determines whether the moving speed of the hand of the operator is less than a prescribed value. The CPU 101 calculates the moving speed of the hand of the operator by recognizing the hand of the operator with a sensor and an image process.

When the CPU 101 determines that the moving speed of the hand of the operator is less than the prescribed value, the process proceeds to step S702. In the meantime, when the CPU 101 determines that the moving speed of the hand of the operator is not less than the prescribed value, the process proceeds to step S705. Although the determination condition for proceeding to the step S702 is that the moving speed of the hand of the operator is less than the prescribed value in the step S701, the determination condition for proceeding to the step S702 may be that the moving speed of the hand of the operator is equal to or less than the prescribed value. In the step S702, the CPU 101 sets the display detailed degree of the polygon to the maximum value in the three dimensional space of the HMD 100. Specifically, the CPU 101 sets the display detailed degree of the polygon to the maximum value for the post-undoing virtual object 207, the pre-undoing virtual object 208, the first route 209, and the second route 210 shown in FIG. 2C.

In step S703, the CPU 101 installs light sources in the three dimensional space of the HMD 100. Specifically, the CPU 101 installs the light sources toward the post-undoing virtual object 207, the pre-undoing virtual object 208, the first route 209, and the second route 210 shown in FIG. 2C. In step S704, the CPU 101 sets to perform the post process about necessity about the post process. Thereafter, the flowchart in FIG. 7 ends. In step S705, the CPU 101 sets the display detailed degree of the polygon to the minimum value in the three dimensional space of the HMD 100. Specifically, the CPU 101 sets the display detailed degree of the polygon to the minimum value for the post-undoing virtual object 207, the pre-undoing virtual object 208, the first route 209, and the second route 210 shown in FIG. 2C. In step S706, the CPU 101 sets not to perform the post process about the necessity about the post process. Thereafter, the flowchart in FIG. 7 ends.

The display detailed degree of the polygon set in the step S702 is not limited to the maximum value and may be a value other than the maximum value. Similarly, the display detailed degree of the polygon set in the step S705 is not limited to the minimum value and may be a value other than the minimum value. The execution order of the steps S702, S703, and S704 is not limited to the order shown in the flowchart in FIG. 7 and may be an order different from the order shown in the flowchart in FIG. 7. Similarly, the execution order of the steps S705 and S706 is not limited to the order shown in the flowchart in FIG. 7 and may be an order different from the order shown in the flowchart in FIG. 7.

Figure 8:
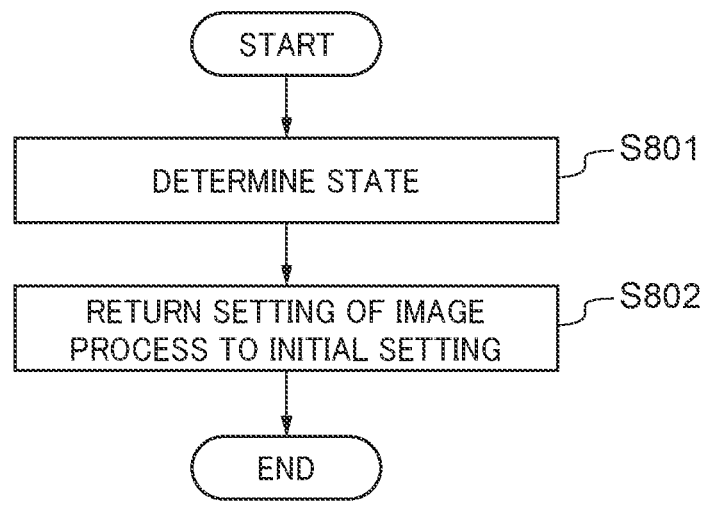
FIG. 8 is a flowchart for implementing a determination unit.

FIG. 8 is a flowchart for achieving the determination unit 307 (a determination step). The flowchart in FIG. 8 is started when the operator selects any one of the coordinates as described in the description of the software logical configuration in FIG. 3. In step S801, the CPU 101 determines a state to which the editing target will transition on the basis of the coordinate selected by the operator. Specifically, the CPU 101 displays the post-undoing virtual object 207 shown in FIG. 2C in a size determined on the basis of the coordinate selected by the operator. In step S802, the CPU 101 returns the setting of the image process that is changed in the flowchart in FIG. 7 to an initial setting. Thereafter, the flowchart in FIG. 8 ends.

As described above, in the first embodiment, when the operator performs the operation to undo the editing of the three dimensional virtual object 201 in the HMD 100, the post-undoing virtual object 207 corresponding to the three dimensional virtual object 201 immediately before the operator performs the editing is displayed. Further, the first route 209 indicating the locus 202 of the hand in the hand interaction performed by the operator in editing and the second route 210 indicating the shortest distance from the operation start point 203 to the operation end point 204 of the locus 202 are displayed in the HMD 100. When the operator selects a coordinate by moving the hand on the first route 209 or the second route 210, the size of the post-undoing virtual object 207 is changed on the basis of the selected coordinate. In this manner, the HMD 100 can increase the possibility that the three dimensional virtual object 201 after the operation related to editing transitions to the state intended by the operator.

Although the second route 210 is represented by the straight line connecting the operation start point 203 and the operation end point 204 of the first route 209 in the above description, it is not limited thereto. For example, the second route 210 may be represented by some function from the operation start point 203 to the operation end point 204 of the first route 209, or may be represented by a combination of a plurality of different functions. Even in such a case, the HMD 100 can increase the possibility that the three dimensional virtual object 201 after the operation related to editing transitions to the state intended by the operator.

Figure 9A:
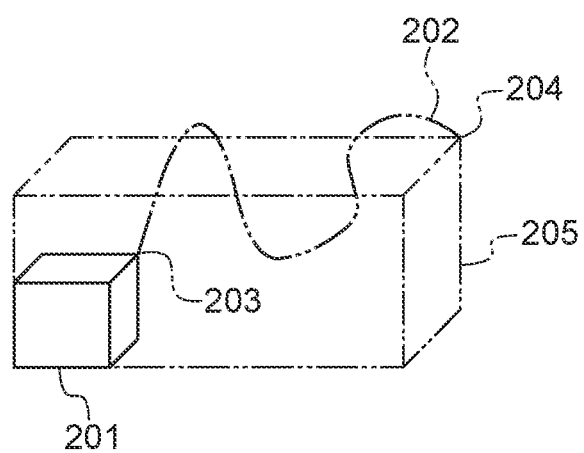
FIG. 9A, FIG. 9B, and FIG. 9C are views showing examples of images that are displayed by the HMD in a second embodiment.
Figure 9B:
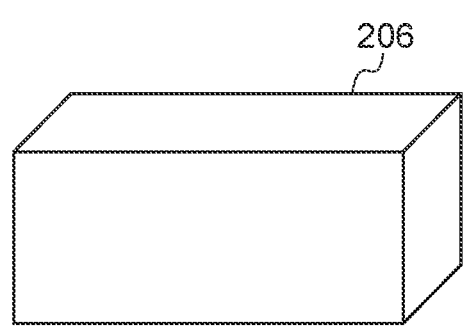
Figure 9C:
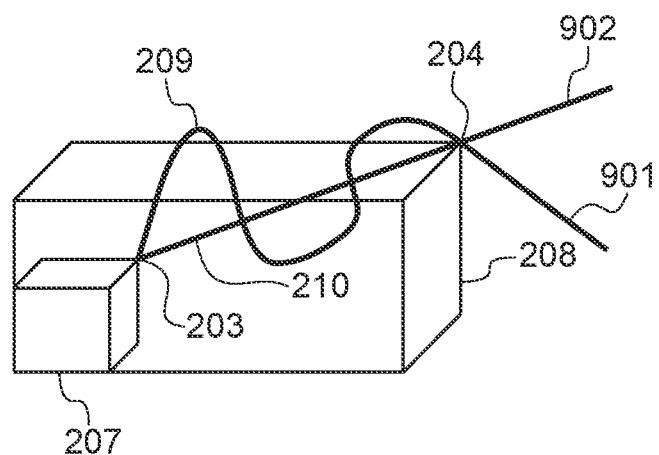

Hereinafter, a second embodiment will be described with reference to FIG. 9 to FIG. 11. Hereinafter, differences from the first embodiment will be mainly described. FIG. 9A, FIG. 9B, and FIG. 9C are views showing examples of images displayed by the HMD 100 in the second embodiment. Since FIG. 9A and FIG. 9B are similar to FIG. 2A and FIG. 2B described above, descriptions thereof will be omitted. FIG. 9C is a view showing a state immediately after the user undoes editing of the three dimensional virtual object 201. As shown in FIG. 9C, immediately after the operator undoes the editing of the three dimensional virtual object 201, a first additional route 901 and a second additional route 902 are displayed in addition to the post-undoing virtual object 207, the pre-undoing virtual object 208, the first route 209, and the second route 210 described above.

The first additional route 901 indicates a line segment obtained by extending the first route 209 from the operation end point 204 in a traveling direction at the operation end point 204 so as to be smoothly continued to traveling from the operation start point 203 to the operation end point 204 along the first route 209. The second additional route 902 indicates a line segment obtained by extending the second route 210 from the operation end point 204 in a traveling direction at the operation end point 204 so as to be smoothly continued to traveling from the operation start point 203 to the operation end point 204 along the second route 210.

In the state where the editing of the three dimensional virtual object 201 is undone, the operator can change the size of the post-undoing virtual object 207 by moving the hand on the first additional route 901, the second additional route 902, the first route 209, or the second route 210 described above. When there is a size intended by the operator among the sizes of the post-undoing virtual object 207 changed in accordance with the hand movement, the operator selects a coordinate on the first route 209 or the second route 210 at which the size intended by the operator is obtained with the hand and determines to undo the editing. Alternatively, the operator manually selects a coordinate on the first additional route 901 or the second additional route 902 at which the size intended by the operator is obtained with the hand and determines to undo the editing. That is, the operator determines to undo the editing of the three dimensional virtual object 201 by manually selecting any one of coordinates on the first route 209, the second route 210, the first additional route 901, or the second additional route 902.

FIG. 10 is a view showing an example of information held by the route information holding unit 301 in the second embodiment. The route information holding unit 301 holds a tip point coordinate information in addition to the locus information described with reference to FIG. 4. The tip point coordinate information represents a three dimensional coordinate indicating a position of a tip end of the first additional route 901 on a side opposite to the operation end point 204 in the first additional route 901.

Figure 11:
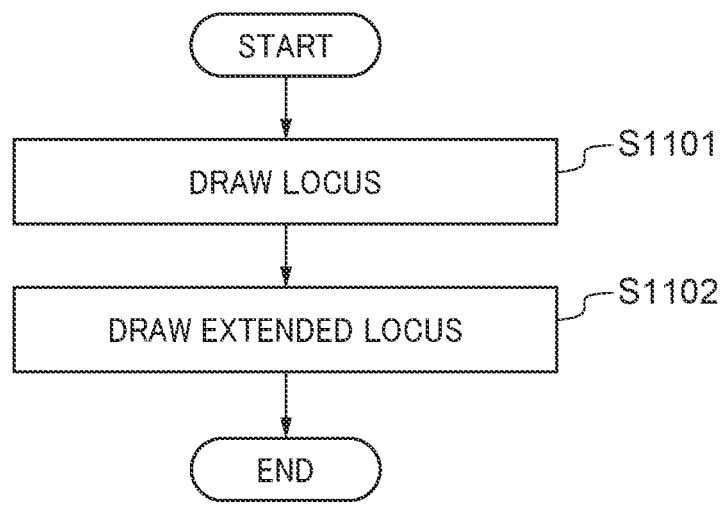
FIG. 11 is a flowchart for implementing a first display unit in the second embodiment.

FIG. 11 is a flowchart for achieving the first display unit 302 in the second embodiment. The flowchart of FIG. 11 is started when the operator performs an operation to undo editing as described in the description of the software logical configuration in FIG. 3. Since step S1101 is the same as the step S501 in FIG. 5, its description will be omitted. In step S1102, the CPU 101 draws an extended locus in the three dimensional space of the HMD 100. The extended locus is a straight line connecting the three dimensional coordinate of the end point of the locus information and the three dimensional coordinate of the tip point coordinate information that are held by the route information holding unit 301. Specifically, the CPU 101 displays the first additional route 901 shown in FIG. 9C mentioned above. Thereafter, the flowchart in FIG. 11 ends. In the second embodiment, the length of the first additional route 901 is not limited. For example, the length of the first additional route 901 may be a prescribed length or may be a length calculated on the basis of the moving speed of the hand of the operator.

The flowchart in FIG. 11 can also be used as a flowchart for achieving the second display unit 303. In this case, in the step S1101, the CPU 101 draws a straight line connecting the start point and the end point of the three dimensional coordinates of the locus information held by the route information holding unit 301 in the three dimensional space of the HMD 100. Specifically, the CPU 101 displays the second route 210 shown in FIG. 9C mentioned above. In the step S1102, the CPU 101 draws a line segment obtained by extending the straight line drawn in the step S1101 from the end point of the straight line in the three dimensional space of the HMD 100. Specifically, the CPU 101 displays the second additional route 902 shown in FIG. 9C mentioned above. The other processes are the same as those for achieving the first display unit 302 described above.

As described above, in the second embodiment, when the operator performs the operation to undo the editing of the three dimensional virtual object 201 in the HMD 100, the post-undoing virtual object 207, the first route 209, and the second route 210 are displayed as with the first embodiment. Further, the first additional route 901 that is the line segment extended from the first route 209 and the second additional route 902 that is a line segment extended from the second route 210 are displayed in the HMD 100. When the operator selects a coordinate by moving the hand on the first route 209, the second route 210, the first additional route 901, or the second additional route 902, the size of the post-undoing virtual object 207 is changed on the basis of the selected coordinate. In this manner, the HMD 100 can increase the possibility that the three dimensional virtual object after an operation related to editing is transitioned to a state intended by the operator.

Further, although the HMD 100 includes the first display unit 302, the second display unit 303, the first selection unit 304, and the second selection unit 305 in each of the embodiments, the HMD 100 may include three or more display units and selection units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-206873, filed Dec. 23, 2022, which is hereby incorporated by reference herein in its entirety.

What is claimed is:

1. An image processing apparatus in which an operation related to editing of a three dimensional virtual object is performed by an operator, the image processing apparatus comprising:
   a memory device that stores a set of instructions; and
   at least one processor that executes the set of instructions to:
   display a first route after the operation;
   display a second route after the operation, the second route being different from the first route;
   allow the operator to select any one of coordinates on the first route;
   allow the operator to select any one of coordinates on the second route; and
   determine a state of the three dimensional virtual object based on the coordinate selected by the operator on either one of the first route and the second route.

2. The image processing apparatus according to claim 1, wherein the operation is an operation of undoing editing of the three dimensional virtual object.

3. The image processing apparatus according to claim 1, wherein the editing of the three dimensional virtual object is performed using a locus of a hand of the operator in hand interaction.

4. The image processing apparatus according to claim 3, wherein the at least one processor executes instructions in the memory device to display the locus as the first route.

5. The image processing apparatus according to claim 3, wherein the at least one processor executes instructions in the memory device to display a straight line connecting a start point and an end point of the locus as the second route.

6. The image processing apparatus according to claim 3, wherein the at least one processor executes instructions in the memory device to display a route from a start point to an end point of the locus represented by a function as the second route.

7. The image processing apparatus according to claim 3, wherein the at least one processor executes instructions in the memory device to display a route from a start point to an end point of the locus represented by combining a plurality of different functions as the second route.

8. The image processing apparatus according to claim 1, wherein the at least one processor executes instructions in the memory device to display a line segment obtained by extending the first route from an end point of the first route as a first additional route,
  wherein the first additional route extends in a traveling direction at the end point so as to be smoothly continued to traveling from a start point of the first route to the end point along the first route.

9. The image processing apparatus according to claim 1, wherein the at least one processor executes instructions in the memory device to display a line segment obtained by extending the second route from an end point of the second route as a second additional route,
  wherein the second additional route extends in a traveling direction at the end point so as to be smoothly continued to traveling from a start point of the second route to the end point along the second route.

10. The image processing apparatus according to claim 1, wherein the at least one processor executes instructions in the memory device to control an image of the three dimensional virtual object based on a moving speed of a hand of the operator.

11. The image processing apparatus according to claim 10, wherein the at least one processor executes instructions in the memory device to change a display detailed degree of the three dimensional virtual object.

12. The image processing apparatus according to claim 10, wherein the at least one processor executes instructions in the memory device to install a light source for illuminating the three dimensional virtual object.

13. The image processing apparatus according to claim 10, wherein the at least one processor executes instructions in the memory device to switch whether to perform a post process to the image of the three dimensional virtual object.

14. A control method for an image processing apparatus in which an operation related to editing of a three dimensional virtual object is performed by an operator, the method comprising:
  displaying a first route after the operation;
  displaying a second route after the operation, the second route being different from the first route;
  allowing the operator to select any one of coordinates on the first route;
  allowing the operator to select any one of coordinates on the second route; and
  determining a state of the three dimensional virtual object based on the coordinate selected by the operator on either one of the first route and the second route.

15. A non-transitory computer-readable storage medium storing a control program causing a computer to execute a control method for an image processing apparatus in which an operation related to editing of a three dimensional virtual object is performed by an operator, the control method comprising:
  displaying a first route after the operation;
  displaying a second route after the operation, the second route being different from the first route;
  allowing the operator to select any one of coordinates on the first route;
  allowing the operator to select any one of coordinates on the second route; and
  determining a state of the three dimensional virtual object based on the coordinate selected by the operator on either one of the first route and the second route.

* * * * *